Feb. 24, 1948.                A. C. DAMAN                2,436,381
                          LOAD RING FOR V-BELTS
                          Filed Jan. 28, 1946

INVENTOR.
Arthur C. Daman
BY
ATTORNEY

Patented Feb. 24, 1948

2,436,381

UNITED STATES PATENT OFFICE 2,436,381

LOAD RING FOR V-BELTS

Arthur C. Daman, Denver, Colo., assignor to Mining Process and Patent Company, Denver, Colo., a corporation of Delaware Application January 28, 1946, Serial No. 643,908

14 Claims. (Cl. 74—230.7)

This invention relates to load rings for V-belts, and more particularly to load rings adapted to be installed in a pulley groove, as to prevent distortion in the belt, particularly when the belt is heavily loaded.

V-belts are so-called because of their inwardly sloping sides, and, in general, have a trapezoidal cross-section. V-belts are generally made of layers of fabric or the like impregnated with rubber or similar materials or compounds, and are utilized in the transmission of power, as from one pulley to another, the pulleys being equipped with V-shaped grooves having a flat bottom, one groove being provided for each belt. On the imposition of a light load, the V-belt tends to move slightly into the groove, or wedge into the groove, as it were, and power is transmitted by the gripping action of the side walls of the belt upon the side walls of the groove. When heavier loads are imposed, the belt tends to move further into the groove but also tends to become distorted in cross-sectional shape when passing around the pulley, due to the unsupported bottom of the belt. (If the pulley groove is made shallower, as soon as the bottom of the belt abuts against the bottom of the groove, the contact pressure against the pulley groove walls becomes lessened, with a consequent loss of power transmission capacity.) Furthermore, such distortion also produces slippage and loss of power during transmission, as well as damage to the belt as by the production of localized stresses which tend to cause the fabric layers to be sheared away from one another. The consequent necessity for early replacement of the belt adds to maintenance and repair costs.

Among the objects of this invention are to provide an improved load ring for V-belts; to provide such a load ring which is formed so that it is compressed into the lower portion of the pulley groove to provide a resilient base for the bottom of the V-belt; to provide such a load ring which will cause the V-belt to maintain its normal shape, and thereby increase the life thereof, as well as minimize slippage; to provide such a load ring which is adapted to be compressed by the V-belt on the imposition of a sufficient load, so as to prevent distortion in the belt; and to provide such a load ring which will be effective in operation and long wearing. Other objects, and the novel features of this invention, will become apparent from the following description.

In accordance with this invention, a load ring for a V-belt is adapted to be installed in the inner portion of a pulley groove, being formed of resilient material and has a cross-sectional shape such that the ring will normally be spaced from the side walls of the groove adjacent the top, bottom, or both, of the ring. Such a ring preferably is provided with a longitudinally extending hole at or adjacent the center thereof, the hole being flattened and the ring being compressed into engagement with the walls of the groove upon relatively heavy loading of the belt. Additional features are shown in the embodiments illustrated in the accompanying drawing, in which:

Figure 1:
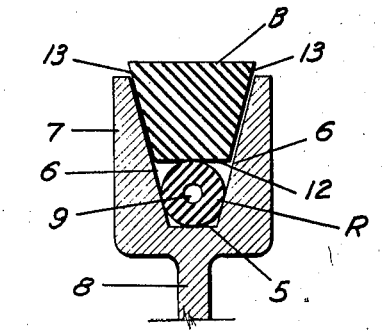
Fig. 1 is a cross-section of a portion of a V-belt pulley, having a load ring forming one embodiment of this invention installed therein, there being substantially no load upon the V-belt.
Figure 2:
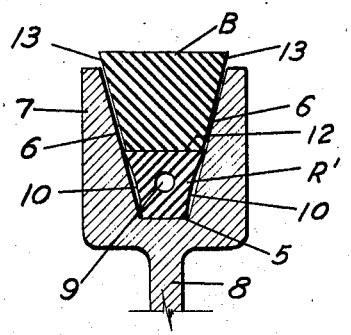
Fig. 2 is a cross-section similar to Fig. 1, illustrating a second embodiment of this invention.
Figure 1A:
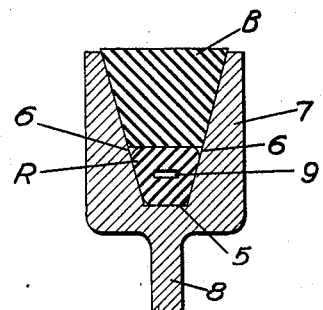
Fig. 1a is a cross-section similar to Fig. 1, illustrating the action of the load ring of Fig. 1 with a relatively heavy load upon the V-belt.
Figure 2A:
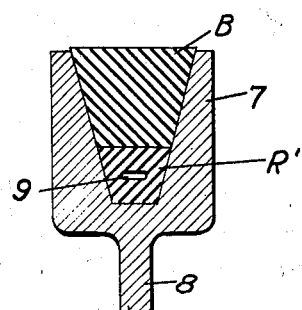
Fig. 2a is a similar cross-section, illustrating the action of the load ring of Fig. 2 when the V-belt is heavily loaded.
Figure 3:
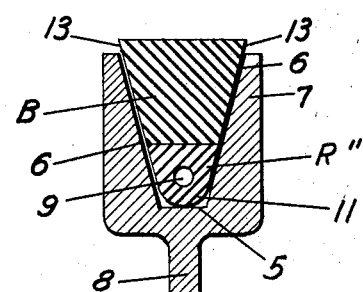
Fig. 3 is a cross-section similar to Fig. 1, illustrating a third embodiment of this invention.
Figure 3A:
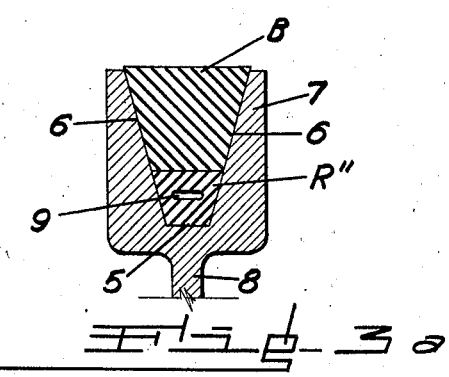
Fig. 3a is a similar cross-section, illustrating the action of the load ring of Fig. 3 when the V-belt is heavily loaded.

In each embodiment of this invention, comprising a load ring R of Fig. 1, a load ring R' of Fig. 2, and a load ring R'' of Fig. 3, the load ring is installed adjacent the bottom 5 of a V-groove formed by side walls 6, in a rim 7 of a pulley 8. The load rings R, R', and R'' are continuous, i. e. they extend completely around the periphery of the pulley, and are preferably made of resilient material, such as rubber, either natural or synthetic. Each load ring is adapted to be compressed by a V-belt B, when a relatively heavy load, for instance, is imposed thereon, as in Figs. 1a, 2a, and 3a, respectively. Each load ring is provided with a longitudinally extending hole 9, preferably circular in cross-section, which is flattened when the ring is compressed upon loading of the belt. The load ring R of Fig. 1 is preferably circular in cross-section, whereas the load ring R' of Fig. 2 is trapezoidal in cross-section but has concave sides 10. The load ring R'' of Fig. 3 is flat on top, as is ring R' of Fig. 2, but the concave bottom 11 thereof is shaped as the arc of a circle. Each load ring is normally spaced from a portion of the side walls of the groove, as adjacent both the top and bottom of the load ring R of Fig. 1, or at the concave sides 10 of load ring R' of Fig. 2, or adjacent the convex bottom 11 of load ring R" of Fig. 3.

As will be evident, when little or no load is imposed upon the belts B, the load rings retain their normal shape, as in Figs. 1, 2, and 3, respectively. However, when a heavier load is imposed upon belt B, the load rings are compressed into the pulley groove, but form a resilient base for the belt, so that distortion of the bottom 12 of the belt is prevented, and the sides 13 of the belts engage the side walls 6 of the V-groove in the desired manner.

When a light load is imposed upon the belt, the load ring is slightly compressed into the pulley groove, the natural resiliency of the material of the load ring resisting such light load. When a heavier load is imposed, the load ring is further compressed, and when a relatively heavy load is imposed, the ring is altered in shape so as to substantially fill the bottom of the groove beneath the belt. However, the central longitudinal hole 9 is flattened, as shown, and adds additional resiliency to the load ring so that very heavy loads can be transmitted without undue slippage or distortion of the belt.

From the foregoing, it will be apparent that load rings for V-belts, constructed in accordance with this invention, fulfill to a marked degree the objects and requirements hereinbefore set forth. In each preferred form, the natural resiliency of the material of which the load ring is made is considerably enhanced by the cross-sectional shape, as well as the longitudinal hole which extends centrally through the ring. In each instance, the deformation of the load ring by the V-belt and the shape assumed by the load ring upon such deformation provides a base or foundation for the V-belt.

It will be evident that numerous changes may be made. For instance, the material of which the load rings are made may differ from that indicated. Also the central longitudinal holes may be eliminated in certain instances, if so desired, and other and different cross-sectional shapes may be utilized.

Although three embodiments of this invention have been illustrated and described, it will be understood that other embodiments may exist, and that additional changes may be made without departing from the spirit and scope of this invention.

What is claimed is:

1. A load ring for a V-belt, adapted to be installed in the inner portion of a pulley groove, said ring being formed of resilient material and having a cross-sectional shape such that a portion of said ring will normally be spaced from the side walls of said groove, said ring being compressible into engagement with the walls of said groove.

2. A load ring for a V-belt, adapted to be installed in the inner portion of a pulley groove, said ring being formed of resilient material and having a longitudinally extending hole at or adjacent the center thereof.

3. A load ring for a V-belt, adapted to be installed in the inner portion of a pulley groove, said ring being formed of resilient material and having a cross-sectional shape such that a portion of said ring will normally be spaced from the side walls of said groove, said ring being compressible into engagement with the walls of said groove, and also having a longitudinally extending hole at or adjacent the center thereof.

4. A load ring for a V-belt, adapted to be installed in the inner portion of a pulley groove, said ring being formed of resilient material and having a cross-sectional shape such that said ring will normally be spaced from the side walls of said groove at least adjacent the top of said ring, said ring being compressible into engagement with the walls of said groove.

5. A load ring for a V-belt, as defined in claim 4, said ring having a longitudinally extending hole at or adjacent the center thereof.

6. A load ring for a V-belt, adapted to be installed in the inner portion of a pulley groove, said ring being formed of resilient material and having a cross-sectional shape such that said ring will normally be spaced from the side walls of said groove at least adjacent the bottom of said ring, said ring being compressible into engagement with the walls of said groove.

7. A load ring for a V-belt, as defined in claim 6, said ring having a longitudinally extending hole at or adjacent the center thereof.

8. A load ring for a V-belt, adapted to be installed in the inner portion of a pulley groove, said ring being formed of resilient material and having a cross-sectional shape such that said ring will normally be spaced from the side walls of said groove along the sides of said ring, said ring being compressible into engagement with the walls of said groove.

9. A load ring for a V-belt, as defined in claim 8, said ring having a longitudinally extending hole at or adjacent the center thereof.

10. A load ring for a V-belt, adapted to be installed in the inner portion of a pulley groove, said ring being formed of resilient material and having a circular cross-section and a longitudinally extending hole at least adjacent the center thereof, said ring being compressible into engagement with the walls of said groove.

11. A load ring for a V-belt, adapted to be installed in the inner portion of a pulley groove, said ring being formed of resilient material and having a flat top, a convex bottom and a longitudinally extending hole at least adjacent the center thereof, said ring being compressible into engagement with the walls of said groove.

12. A load ring for a V-belt, as defined in claim 11, wherein the bottom of said ring conforms to a circular arc, and said longitudinal hole is circular.

13. A load ring for a V-belt, adapted to be installed in the inner portion of a pulley groove, said ring being formed of resilient material and having concave sides and a longitudinally extending hole at least adjacent the center thereof, said ring being compressible into engagement with the walls of said groove.

14. A load ring for a V-belt, adapted to be installed in the inner portion of a pulley groove, said ring being formed of resilient material and having a flat top and bottom and concave sides such that said ring will normally be spaced from the side walls of said groove along the sides thereof, said ring being compressible into engagement with the walls of said groove, and also having a longitudinally extending hole substantially circular in cross-section at least adjacent the center thereof and adapted to be flattened upon compression of said ring.

ARTHUR C. DAMAN.